Jan. 29, 1963 R. C. SCHWACOFER 3,075,634
MACHINE FOR HANDLING ARTICHOKES
Filed Feb. 3, 1958 5 Sheets-Sheet 1

INVENTOR.
RAYMOND C. SCHWACOFER
BY
George A. Maxwell
AGENT

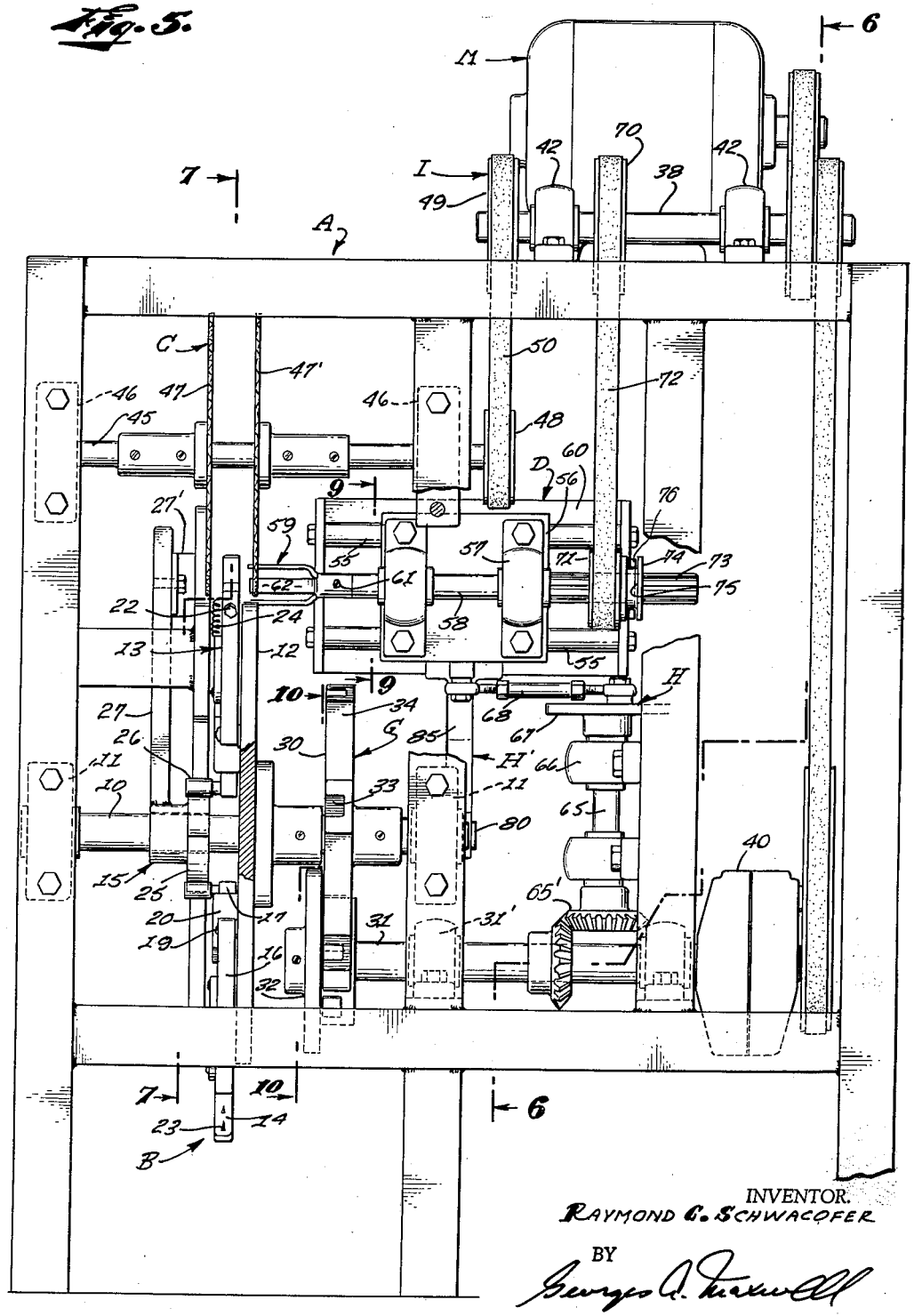

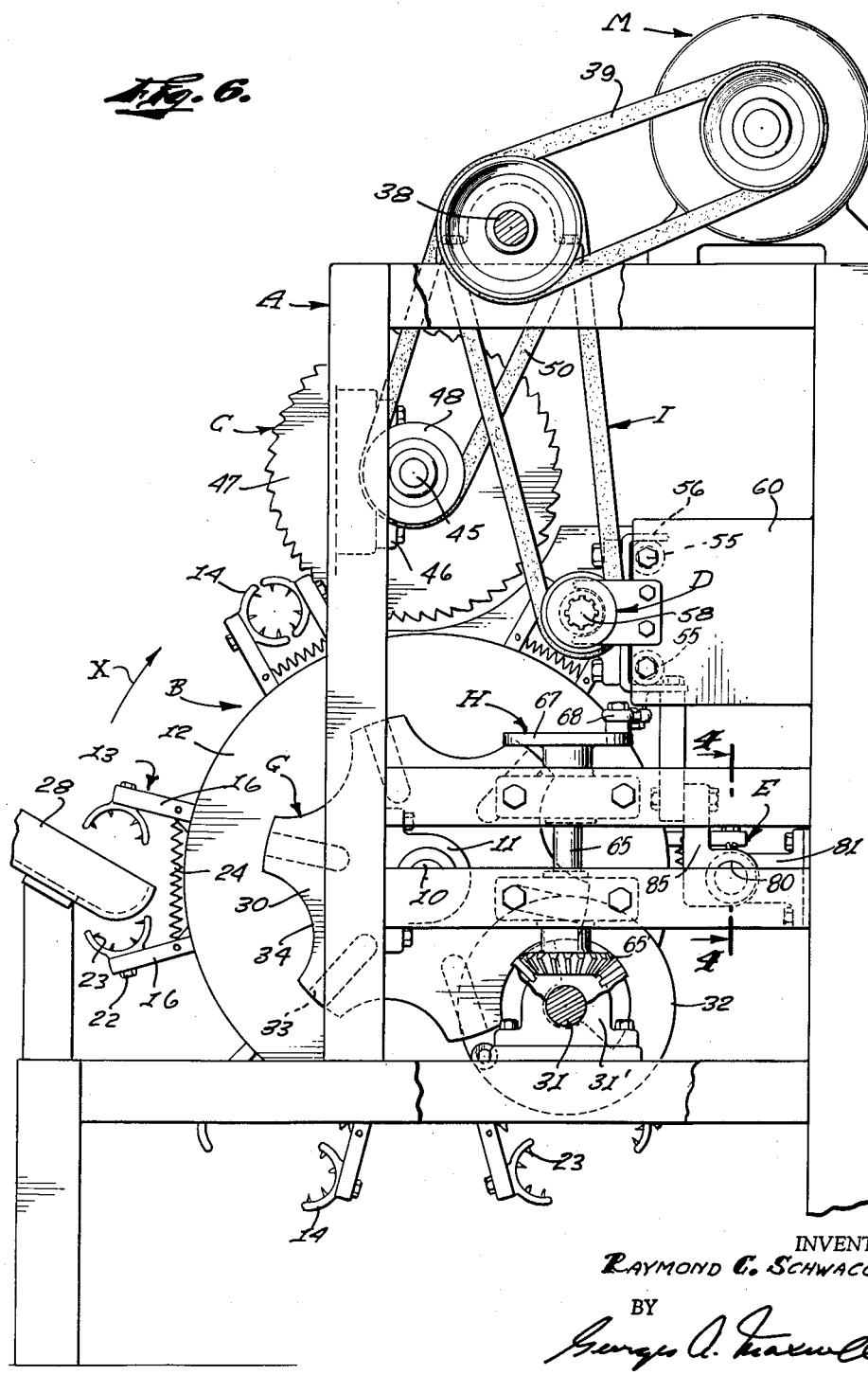

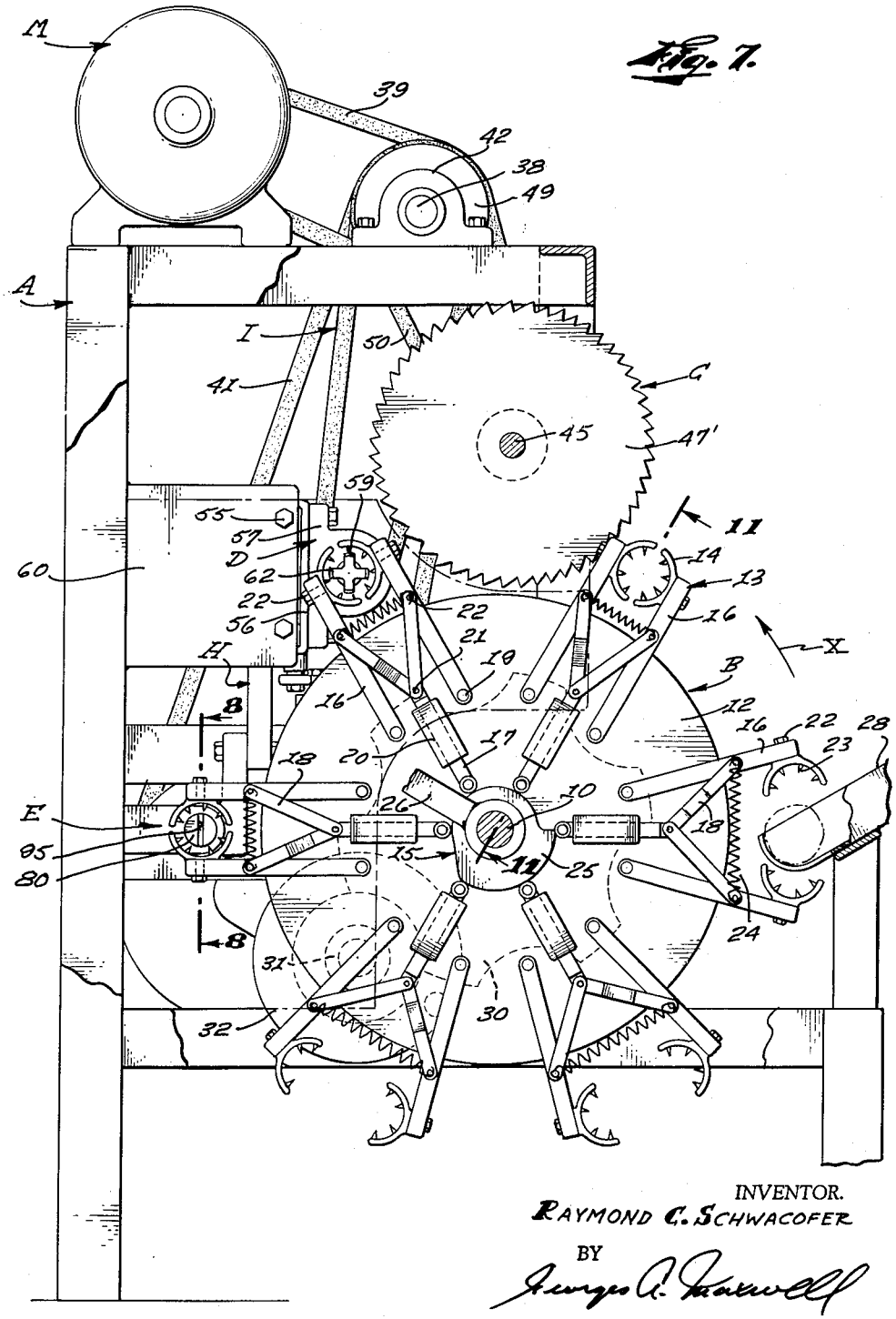

Jan. 29, 1963 — R. C. SCHWACOFER — 3,075,634
MACHINE FOR HANDLING ARTICHOKES
Filed Feb. 3, 1958 — 5 Sheets-Sheet 5
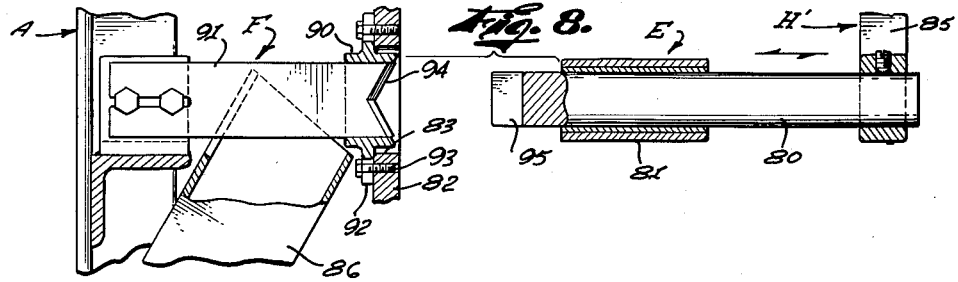
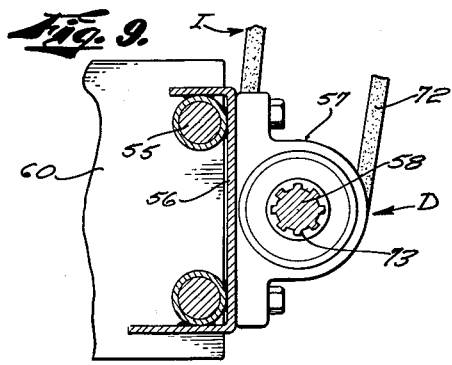
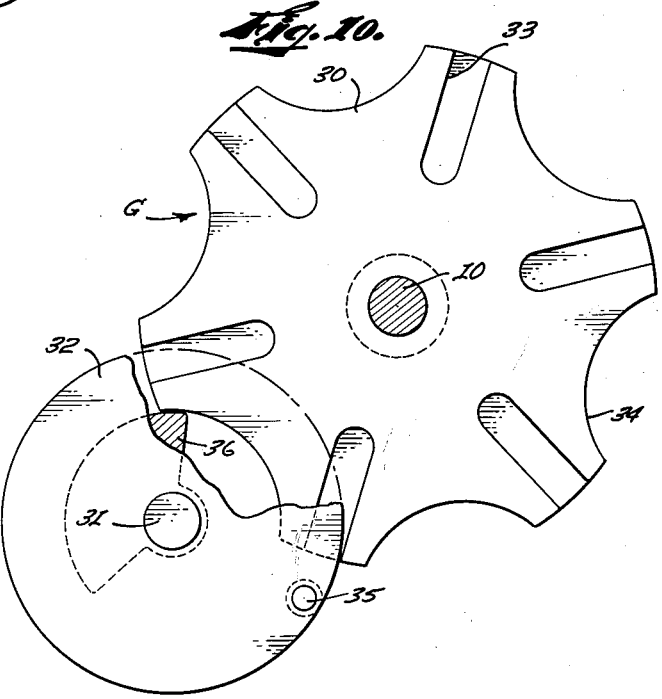
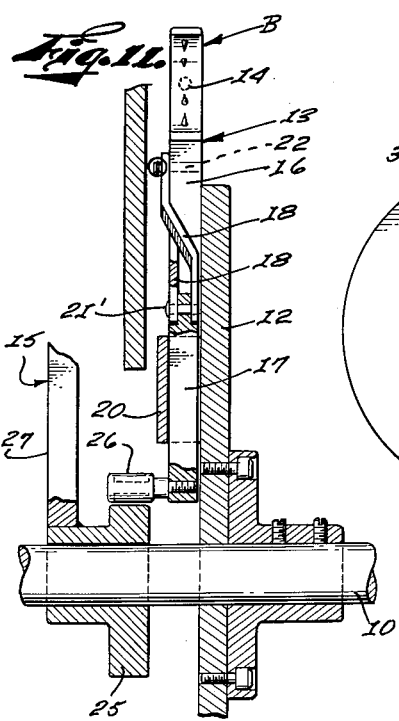
INVENTOR.
RAYMOND C. SCHWACOFER
BY
AGENT United States Patent Office 3,075,634
Patented Jan. 29, 1963

3,075,634
MACHINE FOR HANDLING ARTICHOKES
Raymond C. Schwacofer, 2624 Barkley Ave.,
Santa Clara, Calif.
Filed Feb. 3, 1958, Ser. No. 712,748
3 Claims. (Cl. 198—210)

This invention is concerned with a machine for handling artichokes and it is a general object of the invention to provide a novel machine for separating the edible hearts of artichokes from the fibrous, inedible parts and/or portions thereof.

Artichokes are the flower heads of artichoke plants and are characterized by a stock, an enlargement or receptacle at the upper end of the stock and a plurality of substantially oval-shaped involucral bracts or petals on and projecting upwardly from the receptacle. The receptacle and innermost bracts of the artichoke are tender and edible, while the outer envelope of bracts or petals and the stock are tough and fibrous and are not edible, or are too tough and fibrous for human consumption. The edible portions of an artichoke, that is, the receptacle and innermost bracts, form what is commonly referred to as the heart of the artichoke.

For many years it has been common practice to separate hearts of artichokes from the inedible portions thereof and to can, freeze or otherwise preserve them.

The operation of separating the hearts of artichokes has, prior to the present invention, been carried out primarily by hand. To remove or separate the hearts of artichokes by hand is difficult and requires a great amount of skill, since artichokes are extremely rich in iron and the hearts will oxidize or turn black in a matter of seconds after they have been cut or separated from the remainder of the artichoke. If the hearts are not removed rapidly and suitably blanched, as soon as they are removed, and so that they will not oxidize, they become so unattractive as to be unmarketable.

In past years attempts have been made to provide machines for removing the hearts from artichokes, but each has met with limited success, or for one reason or another has proven impractical.

An object of the present invention is to provide a machine for separating the hearts from artichokes which is highly effective and dependable in operation and is such that hearts are trimmed in a uniform size and shape and in a minimum length of time.

An object of the present invention is to provide a machine of the character referred to which is adapted to handle and act upon a plurality of artichokes simultaneously and into which a steady and constant stream or supply of artichokes can be fed.

Another object of the present invention is to provide a machine for the purpose referred to which is adjustable to handle artichokes of different sizes.

Still another object of the present invention is to provide a machine for the purpose set forth which automatically separates the hearts from the artichokes engaged therein without the necessity of the operator to handle or otherwise manipulate the artichokes after they have once been engaged or fed into the machine.

In many situations, as when the artichokes being handled are extremely large, it has been found desirable to split the artichoke's heart longitudinally into two, like half-sections. It is therefore, a further object of the present invention to provide a machine of the character referred to which quickly and neatly splits the artichoke hearts in two, after they have been separated from the remainder of the artichokes.

The machine of the present invention involves, generally, means for releasably gripping an artichoke about its periphery and intermediate its ends, means adapted to cut off the ends of the artichoke simultaneously while it is gripped, coring means adapted to separate the outer bracts or petals from the artichoke heart while it is still gripped, ejecting means adapted to separate the hearts from the outer petals and slicing means related to the ejecting means and adapted to split the artichoke hearts in two.

The various objects and features of my invention will be fully understood from the following detailed description of a typical preferred form and application of my invention, throughout which description reference is made to the accompanying drawings, in which:

FIG. 5 is a front elevational view of the machine of FIG. 1.

FIG. 6 is a sectional view taken along line 6—6 of FIG. 5.

FIG. 7 is a sectional view taken along line 7—7 on FIG. 5.

FIG. 8 is an enlarged, fragmentary, sectional view taken along line 8—8 on FIG. 7.

FIG. 9 is an enlarged, fragmentary, sectional view taken along line 9—9 on FIG. 5.

FIG. 10 is an enlarged, fragmentary, sectional view taken along line 10—10 on FIG. 5.

FIG. 11 is an enlarged, fragmentary, sectional view taken along line 11—11 on FIG. 7.

Figures 1, 2, 3, 4:
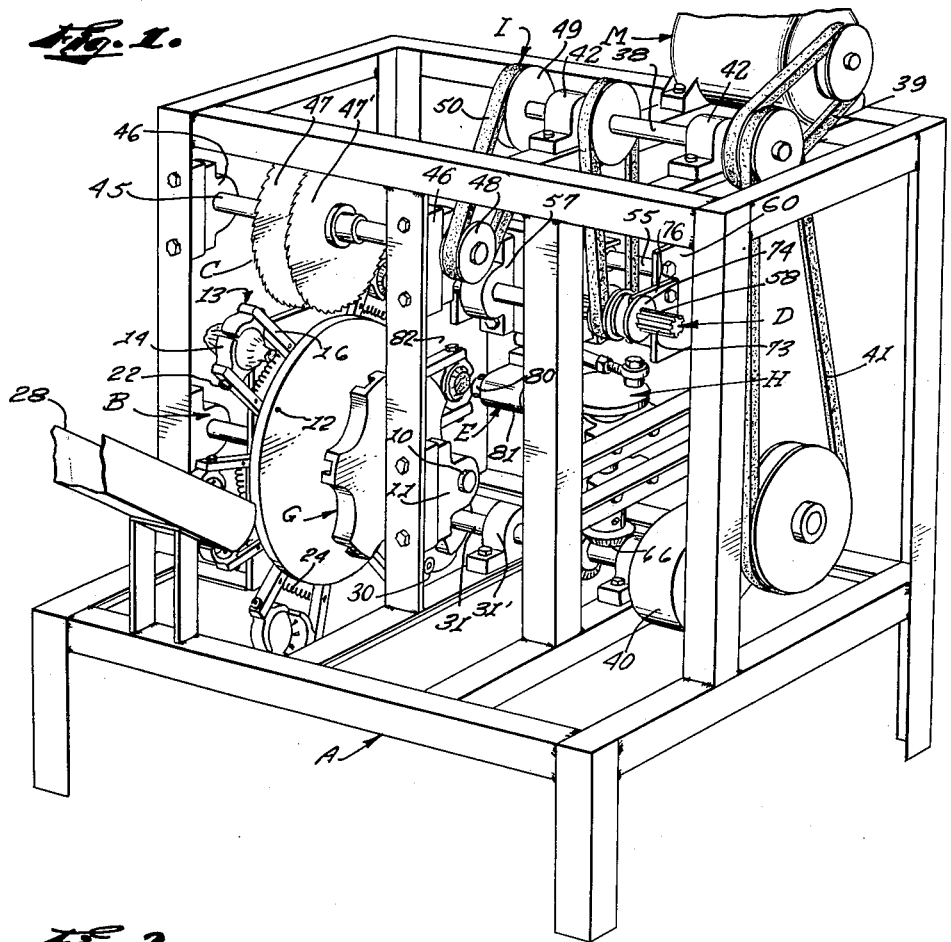
FIG. 1 is a perspective view of an artichoke processing machine embodying the invention and showing the top, front and one side thereof.
FIG. 2 is a perspective view of an artichoke.
FIG. 3 is a perspective view of an artichoke heart, such as is separated from an artichoke by the machine of the present invention.
FIG. 4 is a perspective view of the artichoke heart illustrated in FIG. 3 of the drawings and showing it after it has been split.

The machine provided by the present invention is adapted to remove or separate the tender and edible hearts of artichokes from the fibrous and unedible portions thereof.

An artichoke, as illustrated in FIGS. 2 through 4 of the drawings, includes, a stock 10, an enlarged receptacle 11 at the end of the stock and a plurality of involucral bracts or petals 12 on the receptacle and projecting substantially longitudinally of the receptacle and stock. The stock 10 and the outer bracts 12 are tough and fibrous and not edible, while the receptacle and the inner bracts 12' are tender and establish the edible heart of the artichoke.

The machine that I provide is adapted to separate and split the tender, edible hearts or parts of the artichoke from the tough, flibrous and unedible parts thereof. In operation, the machine initially grips each artichoke engaged therein, about its outer periphery and intermediate its ends, then it simultaneously cuts off and removes the tough, fibrous ends of the artichokes, it next provides a circular cut in the receptacle end of the artichoke to sever the inner, tender heart portion from the tough, outer peripheral portion thereof, then it simultaneously splits the heart in two and urges it out of engagement with the said tough outer peripheral portion and finally, it conducts the split hearts to a suitable location for further treatment.

The machine that I provide involves, generally, an elongate frame A, a gripping means B rotatably carried by the frame and adapted to grip and carry the artichokes to be acted upon, cutting means C adapted to freely receive portions of the gripping means and to cut off the ends of the artichokes carried thereby, laterally shiftable coring means D adapted to sever or cut the hearts of the artichokes free from the outer bracts, and laterally shiftable ejecting means E adapted to urge the hearts of the artichoke out of engagement from the outer bracts and splitting means F related to the ejecting means and adapted to split the hearts in two.

The machine of the present invention further includes, a suitable drive means G adapted to rotate the gripping means B relative to the frame A and the means C, D, E and F, operating means H and H' adapted to shift the coring means D and ejecting means E laterally relative to the frame A and the gripping means B and suitable drive means I and J driving the cutting means and the coring means. The machine further includes a prime mover M carried by the frame A and operatively connected with said drive means G, I and J and with said operating means H and H'.

The frame A that I provide is a substantially square, open, box-like unit fabricated of angle iron and the like, and is characterized by substantially flat, vertically disposed front and rear ends, substantially flat, vertically disposed left and right sides and a horizontally disposed top and bottom. Due to the fact that the particular frame construction does not effect the novelty of the present invention and can vary widely in form and construction, I will not burden this application with detailed description of the particular frame construction illustrated through the drawings.

The gripping means B rotatably carried by the frame A and adapted to grip and carry the artichokes to be acted upon is shown as including, an elongate, horizontally disposed axle shaft 10 rotatably supported on the frame A by a pair of laterally spaced bearings 11 to extend transversely of the frame adjacent the front side thereof, a flat, vertically disposed, disc-shaped rotary plate 12 fixed to the axle shaft intermediate its ends, a plurality of like, circumferentially spaced gripper units 13 carried by the plate 12 and each including a pair of opposed, relatively shiftable artichoke engaging jaws 14, and cam means 15 related to the axle shaft and the gripper units and adapted to actuate the jaws of the gripper units into and out of engagement with the artichokes.

The several gripper units 13 of the gripping means B are alike and each is shown as including, a pair of elongate, laterally spaced arms 16 having inner and outer ends and pivotally connected to the rotary plate 12 to project radially outwardly therefrom, a drive rod 17 shiftably carried by the rotary plate 12 to project radially between the arms 16 and engageable with said cam means 15, and a pair of links 18 pivotally connecting the drive rod 17 and the arms 16.

The inner ends of the arms 16 are pivotally connected to the rotary plate 12 by means of suitable pivot pins 19. The outer ends of the arms project radially outward from the outer periphery of the plate 12 and carry the opposed jaws 14.

The drive rod 17 of each gripper unit 13 is a simple, bar-like member and is shiftably mounted on the inner portion of the rotary plate 12 by means of a suitable bearing 20 and so that it projects radially of the plate and between the inner end portions of the arms 16, as clearly illustrated in FIG. 7 of the drawings.

The pair of links 18 connecting the drive rod 17 and arms 16 are simple, bar-like links having inner and outer ends. The inner ends of the links 18 are pivotally connected to the outer end of the drive rod 17 by means of a suitable pivot pin 21, while the outer ends of the links are pivotally secured to their respective arms 16 at points spaced radially outwardly from the outer end of the drive shaft, by means of suitable pivot pins 22.

With the above relationship of parts, it will be apparent that when the drive rod of each gripper unit 13 is shifted radially relative to the plate 12 and the arms 16, the outer ends of the arms are shifted towards or away from each other and in a manner to shift the jaws 14 carried thereby into and out of engagement with the artichokes fed into the machine.

In the case illustrated, the jaws 14 are shown as simple, semi-circular or arcuate members releasably secured to the outer ends of the arms 16 in spaced, opposed relationship by means of suitable screw fasteners 22. In practice, and in order to prevent accidental displacement of the artichokes from the jaws 14, I provide suitable teeth 23 on the opposed, concave faces of the jaws 14, as clearly illustrated throughout the drawings.

In addition to the foregoing, each gripper unit 13 is shown as being provided with a suitable tension spring 24, which spring is fixed to and extends between the pivot pins 22 carried by the arms 16. The spring 24 normally yieldingly urges the arms towards each other and the drive rod 17 radially inwardly and into engagement with the cam means 15, as will hereinafter be described.

The cam means 15 adapted to actuate the several gripper units 13 into and out of engagement with the artichokes is shown as including a suitable disc cam 25 of limited diametric extent carried by the axle shaft 10 adjacent the side of the rotary plate 12 on which the units 13 are mounted and a follower roller 26 fixed to the inner end of the drive rod 17 of each unit and engaging the outer peripheral edge of the cam.

The cam 25 is held against rotation and is stationary relative to the shaft 10 and the rotary plate 12 by means of suitable arm or bar 27, which arm or bar is fixed to the cam and projects radially outwardly therefrom and to a point where it is suitably secured to the frame A by a bracket 27' (FIG. 5).

The cam 25 is shaped so that when each gripper unit 13 is positioned to project forwardly from the plate 12 and the frame A, the cam holds the push rod 17 thereof forwardly or radially outwardly relative to the plate 12 and in a manner to maintain the jaws 14 apart or in spaced relationship with each other. When the jaws are apart or open in the manner set forth above, an artichoke can be advantageously positioned therebetween, as by means of a suitable feed chute 28, or the like.

The illustrated feed chute 28 is of a width to receive artichokes to be processed with their stem axes extending transversely thereof. The innermost end of the feed chute 28 is curved or troughed as best shown in FIGS. 6 and 7 with the lowermost point 28a thereof in centered register between each pair of curved gripping jaws 14 as successive pairs thereof move into artichoke gripping position. A lengthwise slot 28b (FIG. 7) is provided in the bottom of the chute 28 in position to permit the gripping jaws 14 to pass therethrough upon rotation of these arms about their common shaft 10. As each pair of jaws 14 moves into artichoke gripping position on opposite sides of the feed chute as illustrated in FIGS. 6 and 7, an artichoke positioned in the chute 28 with its stem axis extending transversely thereof will gravitate to the lowermost point 28a of the chute when it is arrested by the curved lower end portion of the chute as shown in broken lines in FIG. 7. In the latter position such artichoke is centered between the gripping jaws when the latter are moved to closed, artichoke gripping position as subsequent rotative advance of the plate 12 allows the cam follower roller 26 associated therewith to move inwardly on the cam 25 and thereby permit the push rod 17 to be shifted inwardly by the bias of its spring 24. Upon rotation of the plate 12 in the direction indicated by the arrows X in FIGS. 6 and 7 of the drawings, the cam 25 allows the push rod 17 to shift radially inwardly, by the action of the spring 24 and so that the jaws 14 shift towards each other and into tight clamped engagement about the artichoke engaged therebetween.

The cam 25 is such that the rotary plate 12 can rotate and shift the said gripper unit approximately 180° in said clamped position, during which travel the artichoke is acted upon by the cutting means C, coring means D and ejecting and splitting means E and F. After the unit is shifted or rotated to the extent set forth above, and after the artichoke engaged therein has been actuated upon, the cam 25, upon continued rotation of the plate 12, urges the push rod 17 of the unit radially outwardly and in a manner to open the jaws and to release the remains of the artichoke that was engaged therein and to prepare them to receive another artichoke.

In the case illustrated, I have shown the rotary plate 12 carrying six circumferentially spaced gripper units 13, as a result of the above, it will be apparent that when the machine is in operation and a steady supply of artichokes is fed into it, four artichokes are engaged in the gripping means B at all times.

The drive means G adapted to intermittently rotate the gripping means B is a simple, Geneva-stop-type of drive mechanism and is shown as including, a follower wheel 30 fixed on the axle shaft 10, a counter-shaft 31 rotatably carried by the frame and a driver wheel 32 on the counter-shaft and engaging the following wheel.

The follower wheel 30 is a flat, vertically disposed, plate-like wheel and is provided with six circumferentially spaced, radially disposed, pin-receiving slots 33 and six circumferentially spaced, radially outwardly facing circular or arcuate hollows 34 about its outer periphery, which hollows occur between the slots 33.

The counter-shaft 31 is a simple, elongate horizontally disposed shaft and is rotatably carried by suitable bearings 31' fixed to the frame A.

The driver wheel 32 is a simple, flat, vertically disposed, disc-shaped wheel fixed to one end of the counter-shaft 31 so that its outer peripheral portion occurs adjacent the outer peripheral portion of the follower wheel 30, at one side thereof. The driver wheel 32 carries an axially disposed drive pin 35 adapted to engage in the slots 33 and an arcuate retaining segment or sector 36 adapted to engage in the hollows 34 of the follower wheel.

With the above relationship of parts, it will be apparent that the follower wheel 30 makes one/sixth of a revolution for each revolution or each turn of the driver wheel 32, the drive pin 35 on the driver wheel working in the slots 33 of the follower wheel to cause the motion of the follower wheel. When the pin 35 is disengaged from the follower wheel, the segment or sector 36 on the driver wheel moves into engagement in or with the corresponding circular hollows 34 in the outer periphery of the follower wheel and maintains the follower wheel stationary and in fixed position until the pin 35 again engages in one of the slots 33 and rotates the follower wheel another one/sixth of a revolution.

With the structure set forth above, it will be apparent that the gripping means B is intermittently rotated one sixth of a revolution each time the driver wheel 32 of the drive means C is rotated one revolution.

In addition to the foregoing, the drive means G includes a suitable drive between the prime mover M and the counter-shaft 31. The prime mover M is shown as a simple, electric motor mounted at the top of the frame A. The drive between the prime mover and the counter-shaft 31 is shown as including an elongate, horizontally disposed power shaft 38 rotatably mounted on the top of the frame adjacent the prime mover M, a belt and pulley drive 39 between the prime mover and the power shaft, a reduction gear 40 fixed to the frame A and connected with the other end of the countershaft 31, and a belt and pulley drive 41 between the power shaft 38 at the top of the frame and the reduction gear 40.

The power shaft 38 is rotatably supported on the top of the frame A by suitable bearings 42 and forms an element of the drive means I and J for the cutting means C and coring means D, as will hereinafter be described.

With the above relationship of parts, it will be apparent that the drive means G for the gripping means B is intermittently operated at a constant rate.

The cutting means C of the machine provided by the present invention is adapted to cut off the ends of the artichokes engaged by the gripping means B and is shown as including, an elongate, horizontally disposed shaft 45 rotatably supported in the frame A by means of a pair of laterally spaced bearings 46. The shaft 45 is located or mounted in the frame A to occur above the gripping means B and to extend transversely of the frame. A pair of axially spaced disc saw blades 47 are mounted on the shaft 45 in spaced relationship with each other and to occur at the opposite sides of the means B. The blades 47 are adapted to freely pass the arms 16 and jaws 14 of the gripper units 13 as the means B is rotated.

The drive means I for the cutting means C includes a driven pulley 48 on the shaft 45 and a drive pulley 49 on the power shaft 38 at the top of the frame, and a drive belt 50 engaged around and extending between the said pulleys 48 and 49.

With the above relationship of parts, it will be apparent that when the machine is in operation, the saws 47 of the means C constantly rotate. It will be further apparent that as the gripping means B is rotated the artichokes engaged thereby are advanced between the blades 47 and 47' of the means C and that the ends of each artichoke, which project from the opposite sides of the jaws 14, are cut off by the blades.

The laterally shiftable coring means D adapted to sever or cut the hearts of the artichokes free from the outer bracts, is shown as including a pair of vertically spaced, horizontally disposed rails 55 suitably mounted on the frame A to extend transversely thereof, a carriage 56 shiftably carried by the rails 55, a pair of laterally spaced and axially aligned bearings 57 on the carriage, an elongated, horizontally disposed shaft 58 rotatably carried by the bearings, and a coring knife 59 carried by the shaft and adapted to be shifted into and out of engagement with the artichokes being acted upon, when the gripping means is held stationary.

The rails 55 of the means D are shown secured to the frame A by suitable, U-shaped bracket 60 so that the carriage, shaft and knife occur rearwardly of the cutting means C and laterally or to the right side of the gripping means B.

The coring knife 59 is shown as including a tubular base 61 suitably secured to the left end of the shaft 58, and as having a plurality of radially offset, circumferentially spaced blades 62 which project axially from the base and the said end of the shaft. In practice, the number of blades 62 provided on the coring knife 59 can be varied and the particular configuration and placement of the blades can be altered or varied to act upon artichokes of various sizes and to cut the hearts of the artichokes in any desired manner.

The means H adapted to shift the coring means D laterally in and out of working engagement with the gripping means B and the artichokes carried thereby is shown as including, an elongate, vertically disposed shaft 65 rotatably supported in the frame A by a pair of vertically spaced bearings 66. The shaft 65 is supported on an axis intersecting the central longitudinal axis of the counter-shaft 31. A bevel gear drive 65' is provided between the lower end of the shaft 65 and the counter-shaft 31 to turn the shaft 65 at the same speed as the counter-shaft. A crank 67 is provided at the upper end of the shaft 65 and a link 68 is provided to pivotally connect and extend between the crank 67 and the carriage 56 of the coring means, as clearly illustrated in FIGS. 5 and 6 of the drawings.

With the above relationship of parts, it will be apparent that when the machine is in operation and the countershaft 31 is rotating, the coring means D is shifted laterally into and out of engagement with the gripping means B. It will be further apparent that the Geneva-stop movement of the means G for the gripping means B and the means H for the coring means D are driven from the counter-shaft 31, and are driven in synchronism with each other.

The means H is timed with the Geneva-stop movement so that it advances the coring knife into engagement with the gripping means B and the artichokes carreid thereby and retracts it therefrom during the period when the quadrant or sector 36 of the means G is engaged in one of the hollows 34 in the follower wheel 30 of the means G, during which time the gripping means B is held or locked in fixed position.

The drive means J for the means D is adapted to rotate the shaft 58 and the knife 59 carried thereby and is shown as including a drive pulley 70 on the power shaft 38 at the top of the frame, a driven pulley 71 on the shaft 58 and a belt 72 engaged around and extending between the pulleys. In the form of the invention illustrated, and to prevent disengagement of the belt 72 from the pulleys 70 and 71, when the carriage 56 is shifted laterally, the portion of the shaft 58 on the which the pulley 71 is engaged, is splined as at 73 and the pulley 71 is engaged thereon, to establish sliding, driving engagement therewith. The pulley 71 is provided with an axially disposed boss 74 at one side thereof, which boss is provided with a radially outwardly opening annular groove 75 and in which a suitable yoke plate 76 (FIGS. 1 and 5) is engaged. The yoke plate 76, engaged in the groove 75 of the boss 74, is fixed to the mounting bracket 60 of the means D and prevents the pulley 71 from shifting relative to the pulley 70 and as the means D is operated.

The ejecting means E adapted to urge the hearts of the artichokes out of engagement from the outer bracts thereof, after they have severed therefrom by the means D, is shown as including a laterally shiftable plunger 80 mounted on the frame A by means of suitable bearings 81 and a back up plate 82. The plunger 81 is mounted on the frame A to occur at the right side of the gripping means B and at a point spaced 60 degrees from the location of the coring means D. The plunger 80 is of considerable longitudinal extent and is adapted to shift laterally into engagement with the hearts of the artichokes engaged by the gripping units 13 after they have been acted upon by the cutting and coring means C and D to urge the said hearts laterally out of engagement with the outer bracts of the artichokes, while the said artichokes are still engaged by the gripping means.

The back up plate 82 (FIGS. 1 and 8) is a simple, flat, vertically disposed plate fixed to the back of the frame A to project forwardly therefrom and occur adjacent the left side of the gripping means B. The plate 82 has an aperture 83 therein, which aperture is in axial alignment with the plunger 80 and is adapted to freely pass the artichoke hearts, urged out of engagement with the gripping means B, by the plunger. In practice, the plunger 80 projects completely through the gripping means and the apertures 83 in the plate 82 when it is actuated. The plate 82 is adapted to back up and hold the outer bracts of the artichokes when the hearts of the artichokes are acted upon by the ejecting means.

The operating means H' for the ejecting means E includes a simple, vertically disposed bar 85 fixed to and extending between the right end of the plunger 80 and the carriage 56 of the coring means D. With this relationship of parts, it will be apparent that the plunger 80 of the ejecting means E is shifted laterally into and out of engagement with the grippings means B by and in synchronism with the coring means D.

In the form of the invention illustrated, a simple discharge chute 86 is provided adjacent the left side of the back up plate 82, below the aperture 83 therein. The discharge chute 86 is adapted to receive the artichoke hearts urged through the aperture 83 by the plunger 80 and is adapted to direct or conduct the said hearts to a point or station removed from the machine to be treated and/or handled as desired.

The splitting means F adapted to split the artichokes' hearts in two is related to the ejecting means E and is shown as including a tubular insert 90 engaged in the aperture 83 in the back up plate 82, concentric with the plunger 80, and a flat, vertically disposed blade 91 in the tube to extend thereacross. When the artichokes' hearts are urged out of engagement with the gripping means B and the outer bracts 12 by the plunger 80 of the ejecting means E, they are urged through the tubular insert 90 and past the blade 91 therein, which blade cuts the hearts in two.

In the case illustrated, the tubular insert 90 of the means E is provided with a radially outwardly projecting mounting flange 92 intermediate its ends, which flange abuts the left side of the back up plate 82 and is secured thereto by means of suitable screw fasteners 93. The blade 91 of the splitting means F is a simple, flat, elongate strop or bar-like member and is secured to the frame A at a point spaced to left side of the insert 90 and projects from the frame through the insert.

The right end of the blade 91 which terminates in the insert 90 is provided with a suitable V-shaped cutting edge 94.

In order that the splitting means F does not interfere with and prevent the proper operation of the ejecting means E, the left end of the plunger of the ejecting means is provided with a transverse slot 95, which slot is adapted to freely receive the cutting end portion of the blade 91 when the plunger is shifted in a manner to eject the artichoke hearts from the means B and to urge them through the insert 90.

In practice, the artichokes to be acted upon by the machine that I provide are graded or classified as to size before they are fed into the machine. As a result of the above, before each classified batch of artichokes is fed into the machine, the several means B, C, D and F may have to be adjusted or varied to handle a different size of artichoke. Such adjustment can be easily and conveniently obtained by first replacing the jaws 14 of the several gripper units 13 with jaws of a desired size, second shifting the blades 47 of the cutting means longitudinally of the shaft 45 to desired spaced relationship with respect to the gripping means, next, replacing the coring knife 59 with a knife of desired size and shape, and finally, replacing the insert 90 and splitting blade 91 with an insert and blade of desired size.

It is to be understood that all of the above adjustments need only be made when the size of the batches of artichokes varies widely and that in practice and when the size variations between batches of artichokes is slight, none of the above adjustments is necessary, or only certain of the means need be adjusted, as circumstances require.

With the construction set forth above, it will be apparent that I have invented a novel machine for removing the hearts from artichokes, which machine is simple, practical and both highly effective and dependable in operation.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. In a machine for removing the hearts from artichokes, a gripper support plate mounted for step-by-step rotation about a horizontal axis, a plurality of pairs of gripper arms mounted radially and symmetrically about said support plate for rotation therewith, one pair of gripper arms being provided for each rotative step of the support plate about its axis, artichoke gripping means on the outer end of each gripper arm, a feed chute sloping toward the support plate and having a gap in its lower end for passage of the artichoke gripping means therethrough upon rotation of the support plate, artichoke ar- resting means at the lower end of the feed chute, said arresting means being located to arrest an artichoke gravitating down the feed chute in centered register between successive artichoke gripping means upon each rotative step of the support plate, means for separating each pair of gripping means at its position of register with the gap in the lower end of the feed chute, whereby an artichoke gravitating down the chute with its stem axis transversely thereof, and arrested at the lower end thereof by the arresting means, is positioned between the pair of gripping means in centered register therewith, and means for closing each successive gripping means in register with the gap in the feed chute to grip such artichoke in centered position therein substantially simultaneously with the initiation of each rotative step of the support plate and the gripping means mounted thereon.

2. An arrangement according to claim 1 wherein each gripping means comprises a concavely curved, inwardly facing member, and a plurality of artichoke piercing spikes are mounted to project inwardly from the concave portion thereof, said spikes being of a length to pierce only the outer portion of an artichoke gripped in said gripping means.

3. In a machine for removing the hearts from artichokes, a gripper support plate mounted for step-by-step rotation about a horizontal axis, a plurality of pairs of gripper arms mounted radially and symmetrically about said support plate for rotation therewith, one pair of gripper arms being provided for each rotative step of the support plate about its axis, a concavely curved, inwardly facing artichoke gripping jaw on the outer end of each gripper arm, feed means having a gap therein for passage of the artichoke gripping jaws therethrough upon rotation of the support plate, artichoke positioning means incorporated in said feed means and located to position an artichoke in the feed means with its stem axis extending transversely thereof and in centered register between each successive pair of artichoke gripping jaws upon each rotative step of the support plate, means for separating each pair of gripping jaws at its position of register with the positioning means of the feed means, whereby an artichoke positioned thereby in centered register between said each pair of gripping jaws, and means for closing the gripping jaws in register with the positioning means to grip such artichoke in centered relation therebetween substantially simultaneously with the initiation of each rotative step of the support plate and the gripping means mounted thereon.

References Cited in the file of this patent
UNITED STATES PATENTS

| | | |
|---|---|---|
| 418,495 | Brooks | Dec. 31, 1889 |
| 573,551 | Sternberg | Dec. 22, 1896 |
| 828,865 | Spain | Aug. 14, 1906 |
| 1,385,874 | Kohr | July 26, 1921 |
| 1,445,345 | Moorshead | Feb. 13, 1923 |
| 2,342,131 | Erickson | Feb. 22, 1944 |
| 2,570,069 | Novak | Oct. 2, 1951 |
| 2,716,480 | Dotta | Aug. 30, 1955 |